United States Patent
Wang

(10) Patent No.: US 6,521,027 B1
(45) Date of Patent: Feb. 18, 2003

(54) AIR CLEANER

(76) Inventor: Sheng Shyong Wang, 7 Fl., No. 1, Sec. 1, Chungyang Road, Sanchung City, Taipei (TW)

( * ) Notice: Subject to any disclaimer, the term of this patent is extended or adjusted under 35 U.S.C. 154(b) by 0 days.

(21) Appl. No.: 09/715,649

(22) Filed: Nov. 17, 2000

(30) Foreign Application Priority Data

Nov. 19, 1999 (TW) ...................................... 88219728 U

(51) Int. Cl.[7] .............................................. B01D 47/02
(52) U.S. Cl. ............................. 96/240; 96/279; 96/335; 96/350; 96/351
(58) Field of Search .......................... 95/226, 195, 196, 95/205; 96/269, 278, 279, 333, 335, 337, 338–346, 350–354, 240, 234; 210/267

(56) References Cited

U.S. PATENT DOCUMENTS

| | | | |
|---|---|---|---|
| 2,000,706 A | * | 5/1935 | Lowther |
| 2,014,144 A | * | 9/1935 | Mensing |
| 4,005,999 A | * | 2/1977 | Carlson |
| 4,300,924 A | * | 11/1981 | Coyle |
| 4,482,524 A | * | 11/1984 | Hardison |
| 5,520,714 A | * | 5/1996 | Muschelknautz |
| 5,873,930 A | * | 2/1999 | Sanchez |
| 6,210,468 B1 | * | 4/2001 | Carson |

FOREIGN PATENT DOCUMENTS

| | | |
|---|---|---|
| TW | 56526 | 7/1972 |
| TW | 81209751 | 7/1981 |

* cited by examiner

*Primary Examiner*—Duane S. Smith
(74) *Attorney, Agent, or Firm*—Harness, Dickey & Pierce, P.L.C.

(57) ABSTRACT

An air cleaner includes a scrubber, a water purifier and a water feeder. The scrubber includes a housing being provided with a central tank and an air outlet. A barrel is disposed inside the housing so as to form a scrubbing room with the central tank. An air pump is disposed on top of the housing for pumping air into the scrubbing room via a pipe extending downward to the central tank so as to force scrubbing water contained in the central tank sprayed upward and scattered. One or a plurality of perforated middle barrels are disposed inside the scrubbing room in a manner coaxial with the central tank for dividing the sprayed water into fine drops. The water purifier have a filtering layer and an activated carbon part for purifying the scrubbing water. A water feeding means is disposed on the upper portion of the scrubbing room for supplying scrubbing water.

5 Claims, 3 Drawing Sheets

AIR CLEANER

FIELD OF THE INVENTION

This invention relates to an air cleaner, and more particularly to a scrubbing type air cleaner which can be operated in a low cost and effectively remove particulates and solvable pollutants in air.

BACKGROUND OF THE INVENTION

In the air pollution control field, a scrubbing method have advantages in simple operation and high efficient removal of particulates and solvable pollutants in the air. Various apparatus utilizing such a method, such as the spraying tower, Venturi scrubber and the packed tower have been widely used in many sites for processing polluted air. Taiwan Patent Application No. 56,526 discloses a multi-layer air cleaner in which the polluted air is pumped into a purifying tank and is filtered by the operation of a rapid eddy in water caused by the air stream. The purified air rising up and entering into a second layer having a cone shape generates a rapid eddy in water again and is thus purified by water again. The purified air is pumped out by a venting apparatus disposed on the upper portion of the air cleaner. This apparatus has disadvantages in limited processing speed and complex structure. Taiwan Patent Application No. 81,209,751 discloses an indoor water sprayer which can also work as an air cleaner. The sprayer is provided with a circulating pump and a nozzle. Water pumped by the circulating pump will be sprayed upward via the nozzle for scrubbing the air. This sprayer may have a better mixing effect of air and liquid, but the nozzle is easily blocked.

SUMMARY OF THE INVENTION

One object of this invention is to provide an air cleaner which can effectively perform a purifying operation of mass air in a low cost, and is adapted to be used in the peripheries of sites and roads for reducing air pollution in the working area and urban.

Another object of this invention is to provide an air cleaner which is provided with a fine-drop generating means for achieving high mixing effect of air and liquid without a problem that a nozzle is easily blocked.

Still another object of this invention is to provide an air cleaner which can recycle scrubbing water and thus has economic operation cost.

According to one aspect of this invention, an air cleaner comprises:
  a scrubber including a housing being provided with a central tank for containing scrubbing water at lower portion thereof and having an air outlet for discharging air at a side wall thereof, a barrel being disposed inside the housing so as to form a scrubbing room with the central tank, an air pump being disposed on top of the housing for pumping air into the scrubbing room in a high speed via a pipe extending downward to the central tank so as to force scrubbing water contained in the central tank sprayed upward and scattered, and one or a plurality of perforated middle barrels being disposed inside the scrubbing room in a manner coaxial with the central tank for dividing the sprayed and scattered water into fine drops;
  a water purifier having a filtering layer and an activated carbon part for purifying the scrubbing water discharged from a water discharging pipe connecting the central tank and the water purifier; and
  a water feeding means being disposed on the upper portion of the scrubbing room for supplying scrubbing water into the central tank from the water purifier through a water supplying pipe connecting the water feeding means and the water purifier.

According to another aspect of this invention, the barrel in the air cleaner is further provided with an inner air outlet at one side wall, and the water feeder further has an flat water outlet disposed above the inner air outlet for generating a water-curtain falling down to the inner air outlet.

According to still another aspect of this invention, a plurality of perforated filtering plates are disposed around an area outside the inner air outlet for performing an additional scrubbing operation in conjunction with the water-curtain.

According to still another aspect of this invention, an upper limit of water level in the central tank is about half the height of the central tank.

According to another aspect of this invention, a water-mill type activated carbon adsorbing apparatus comprises a plurality of symmetrical separation plates and an activated carbon bag disposed between each pair of adjacent separation plates and is adapted to be rotated in a water purifier by a drive motor so as to adsorb pollutants in water.

BRIEF DESCRIPTION OF THE DRAWINGS

The above and other objects, features and advantages of this invention will be more apparent from the following explanation with reference to drawings, wherein.

DETAILED DESCRIPTION OF THE PREFERRED EMBODIMENT

Figure 1:
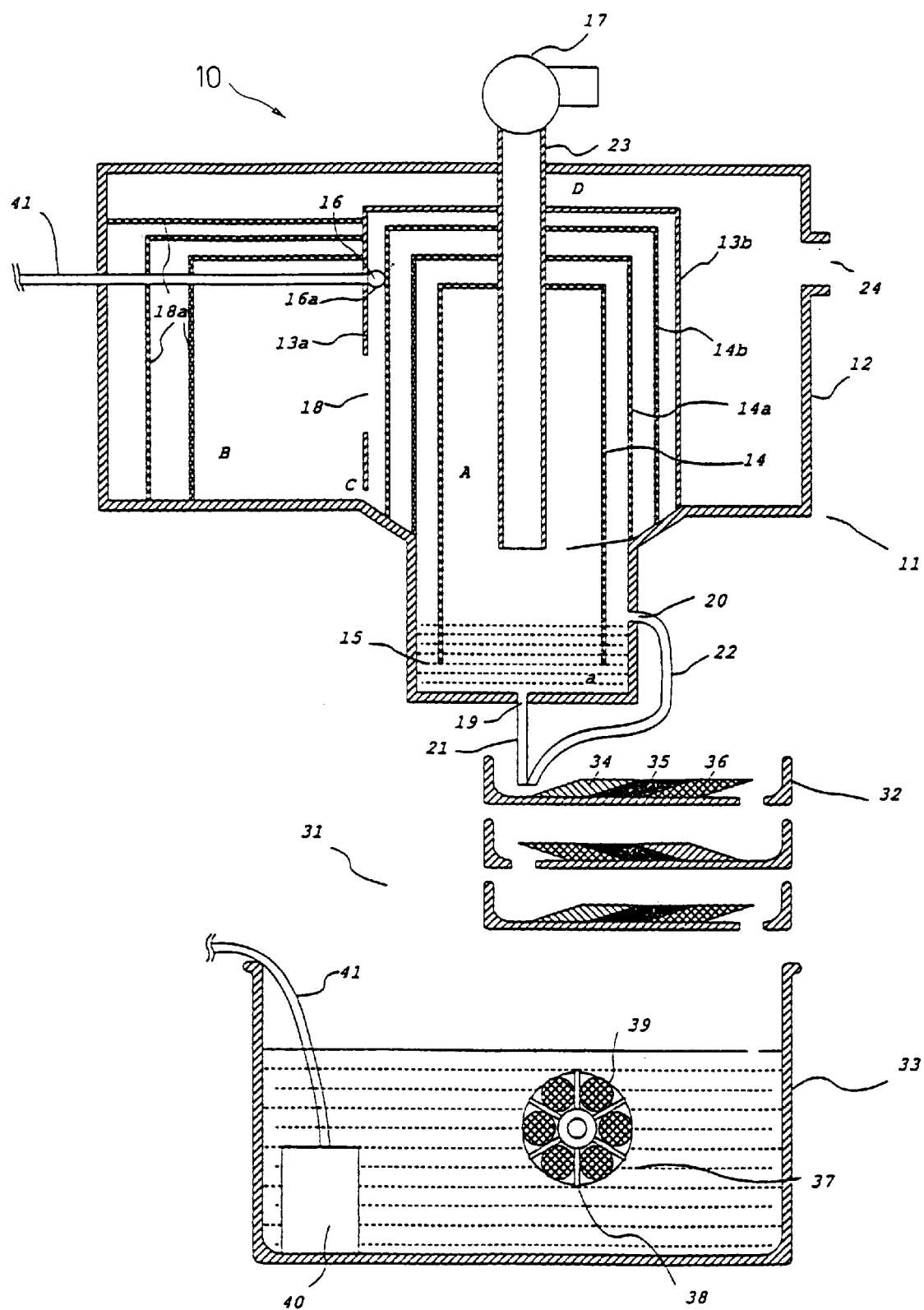
FIG. 1 is a cross-sectional view of the air cleaner according to this invention.

The preferred embodiment according to the present invention will be explained below with reference to drawings. FIG. 1 schematically illustrates an air cleaner according to the embodiment of the present invention. The air cleaner 10 comprises a scrubber 11 and a water purifier 31. The scrubber 11 includes a housing 12 provided with a central tank 15 at the lower portion thereof for containing scrubbing water. An air pump 17 is disposed on the top of the housing 12 for pumping polluted air from outside atmosphere into the scrubber 11 through an air pipe 23. A barrel 13 having two side walls 13a and 13b is arranged inside the housing 12 in which the side wall 13b is closely connected with the central tank 15 and the side wall 13a is separated from the central tank 15 with a gap c. A scrubbing room A is formed with the barrel 13 and the central tank 15 together. The polluted air is pumped into the central tank 15 containing scrubbing water through the air pipe 23 in a high speed so that the scrubbing water contained in the central tank 15 is strongly sprayed upward into the scrubbing room A by the strong impacting force of the pumped air when the air pump 17 is started, and thus an initial scrubbing operation is effectively performed with the scrubbing water so as to achieve filtering effect.

Figure 2:
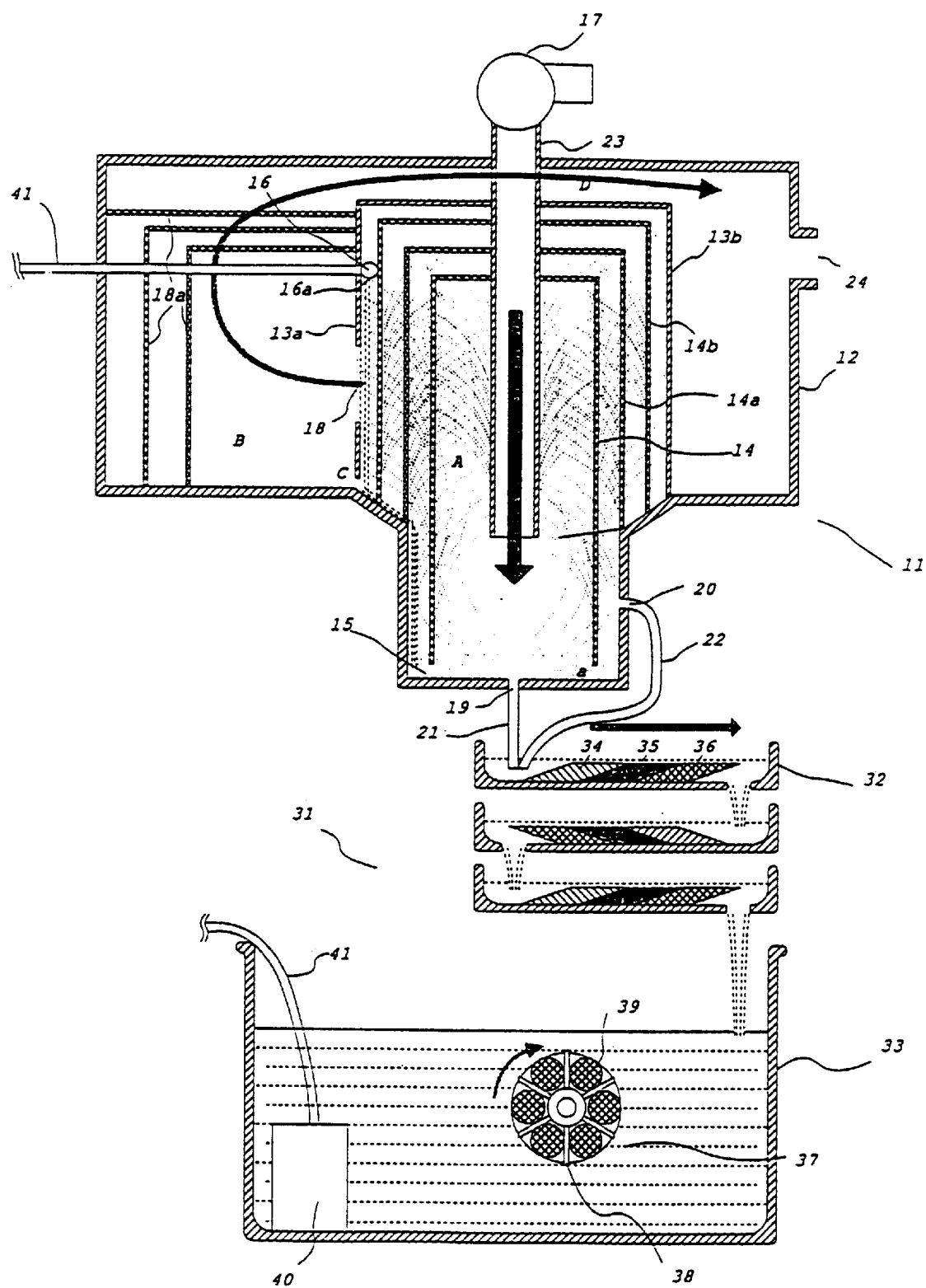
FIG. 2 is a diagram showing the operation of the air cleaner according to this invention.
Figure 3:
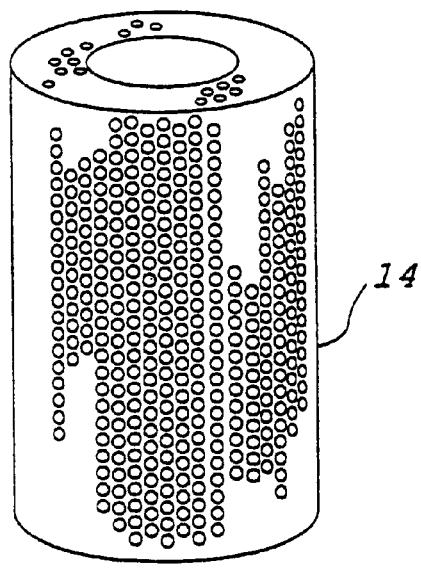
FIG. 3 is an illustration of a perforate middle barrel according to this invention.

A perforated middle barrel 14 having an opening at its lower portion is disposed inside the barrel 13 in a manner coaxial to the tank 15. As shown in FIG. 3, a plurality of circular openings are uniformly distributed over the top and side wall surfaces of the barrel 14. After the scrubbing water inside the central tank 15 is sprayed upward by the strong pumped air, the sprayed water impacts the inner wall of the middle perforated barrel 14 and is further divided into finer water drops by those fine circular openings arranged on the wall of the barrel while passing through the barrel 14, as shown in FIG. 2. Thus, the number of scattered water drops in the scrubbing room is increased and the probability of contact of air with drops is raised. Preferably, the bottom edge of the middle perforated barrel 14 extends downward to be close to the bottom of central tank 15 by a gap a so as to divide the sprayed water into drops effectively. Furthermore, a plurality of perforated barrels (preferably, three designated as 14, 14a and 14b, respectively) can be arranged inside the housing 12 in a coaxial manner such that the velocities of water drops at the inner air outlet 18 can be properly reduced. Some of the fine drops flow down along the inner wall of the barrel 13, and the other of fine drops directly fall down into the central tank 15.

Figure 4:
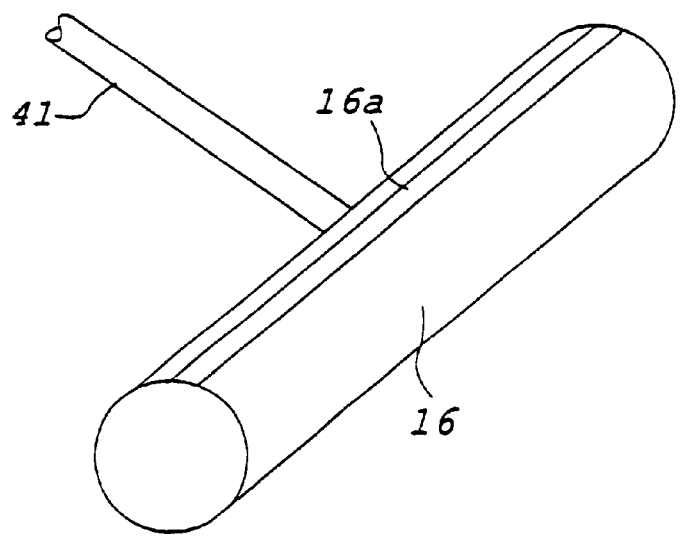
FIG. 4 is a bottom view of a water-curtain generating means according to this invention.

The inner air outlet 18 is formed in one side of the side wall 13a to guide the scrubbing air from the scrubbing room A into area B between the side wall 13a and housing 12. A water-curtain generating means disposed above the air outlet has a strip-like water outlet 16a for generating a water-curtain at the inner side of the air outlet 18 in order to continuously supply processed scrubbing water to the central tank 15. FIG. 4 is a bottom view of the water-curtain generating means. The water outlet 16a has a width in a direction perpendicular to the paper surface larger that of the inner air outlet 18 so that the discharged air have to be filtered by this water-curtain before leaving the scrubber. A plurality of perforated plates 18a may be disposed around an area outside the air outlet 18. As shown in FIG. 2, since the air flow introduced into the area B from the scrubbing room A via the inner air outlet 18 is very strong, some of water drops in the water-curtain are forced to bombard the plurality of plates 18a so that many drops and water vapor are generated inside the area B. Therefore, an additional scrubbing operation is performed in the area B, again. In a manner similar to that in the scrubbing room A, in the area B, some of the fine drops flow downward along the outer wall of the barrel 13 and the inner wall of the housing 12, and other water drops directly fall down into the central tank 15 through the gap C at the lower part of the barrel 13.

An air outlet 24 is formed in the wall of the housing 12 opposite to the outlet 18. As shown in FIG. 2, the scrubbed air will follow the arrow to be discharged into the atmosphere through the channel D between barrel 13 and the housing 12.

Furthermore, a water outlet 19 having a small diameter is formed in the bottom of the central tank 15 in order to discharge the scrubbing water through pipe 21 in a slow rate for preventing the particulates from precipitating in the bottom of the central tank 15. In the side wall of the central tank 15, another water outlet 20 having a diameter larger that that of the water outlet 19 is formed at a position about half the height of the central tank 15. When the water level inside the central tank 15 reaches upto the this outlet 20, the scrubbing water therein will overflow out of the central tank 15 into a filtering tank 32 (explained below) through a pipe 22, and thus the water level inside the central tank 15 can be controlled at a certain height.

In general, the scrubbing water should be purified periodically in order to maintain scrubbing effect. According to this invention, a water purifier is provided to recycle the scrubbing water. With reference to FIG. 1 again, the water purifier 31 according to the embodiment of this invention includes a filtering tank 32 and a water-mill type activated carbon adsorbing tank 33. A plurality of filtering layers are disposed inside the filtering tank 32. The plurality of filtering layers are fine Nylon net 34, non-woven cloth 35 and activated carbon adsorbing layer 36 in order following the direction of water flow. Inside the filtering tank 32, suspending particulates in the scrubbing water are substantially blocked and filtered out. As shown in FIG. 2, the flow of water discharged from the scrubber 11 follows the direction of the arrow. First, it passes through the Nylon net 34 and thus particulates having larger sizes is blocked by the net 34 and a coarse filtering effect is achieved. Then, the water is filtered by the nonwoven cloth 35 in order to block particulates having smaller sizes. Finally, the filtered water passes through the activated carbon adsorbing layer 36 for adsorbing pollutants and is discharged out from the lower outlet in the tank 32. The activated carbon adsorbing layer 36 has a structure in which a plurality of activated carbon particulates are filled in a perforated basket and a plurality of bags containing activated carbon are placed in front of the perforated basket so that activated carbon can be effectively filled in and have a larger contact surface area.

Those three filtering layers 34, 35 and 36 inside the filtering tank 32 are disposed in such a manner that the upper portion is open to let the re-cycling water can flow through the upper portion. Although three filtering tank 32 are used in this embodiment, it should be understood that a plurality of filtering tanks can be used not limited to three.

The water discharged from the final filtering tank 32 directly flow into the water-mill type activated carbon adsorbing tank 33 and accordingly toxic substances in the water will be adsorbed by the activated carbon. As shown in FIG. 2, a rotating means 37 is disposed in the water-mill type activated carbon adsorbing tank 33. This rotating means 37 is provided with six blades 38 arranged in equal angle. An activated carbon bag 39 is placed between each pair of adjacent blades 38 and is fastened onto the rotating means 37 by a plastic net. Each activated carbon bag is formed by packing particulate activated carbon with nylon cloth in order to achieve optimal surface contact effect. A shaft of the rotating means 37 extends into a side surface of the adsorbing tank 33 and is connected to a drive motor through a speed reduction mechanism. The rotating mechanism 37 is immersed in the water and is rotated by the drive motor in a slow speed during operation. This rotation can further enhance the adsorbing effect of the activated carbon. A sucking pump 40 is provided in the adsorbing tank 33 for pumping the purified scrubbing water to the water-curtain generating means 16 through a pipe 41 so that the purified water can be supplied into the scrubber 11 again. Thus, one scrubbing and purifying cycle is completed.

The filtering layer inside the filtering tank 32 and the activated carbon in the rotating means 37 can be periodically replaced in a simple way so as to keep the air cleaner in a good operating condition.

Further, a specific adsorbent such as alkaline, salt, and organic solvent may be added into the activated carbon adsorbing tank 33. The scrubbing operation can be performed with the scrubbing water mixed with the adsorbent so as to further adsorb gas pollutant such as $SO_2$, $H_2S$, $HCl$, $NH_3$, $NO_x$ and $C_xH_y$.

It is understood that while the invention has been described in conjunction with the detailed description thereof, the foregoing description is intended to illustrate and not limit the scope of the invention, which is defined by the scope of the appended claims.

What is claimed is:

1. An air cleaner comprising:

a scrubber including:
- a housing being provided with a central tank for containing scrubbing water at a lower portion thereof and having an air outlet for discharging air at a side wall thereof;
- a barrel being disposed inside the housing so as to form a scrubbing room with the central tank;
- an air pump being disposed on top of the housing for pumping air into the scrubbing room at a high speed via a pipe extending downward to the central tank so as to force scrubbing water contained in the central tank sprayed upward and scattered; and
- at least one perforated middle barrel being disposed inside the scrubbing room in a manner coaxial with the central tank, for dividing the sprayed and scattered water into fine drops;

a water purifier having a filtering layer and an activated carbon part for purifying the scrubbing water discharged from a water discharging pipe connecting the central tank and the water purifier; and a water feeding means being disposed on the upper portion of the scrubbing room for supplying scrubbing water into the central tank from the water purifier through a water supplying pipe connecting the water feeding means and the water purifier.

2. The air cleaner as claimed in claim 1 wherein said barrel further includes an inner air outlet at one side wall, and wherein said water feeder further includes a flat water outlet disposed above said inner air outlet for generating a water curtain falling down to said inner air outlet.

3. The air cleaner as claimed in claim 2, further comprising a plurality of perforated filtering plates being disposed around an area outside said inner air outlet for performing an additional scrubbing operation in conjunction with said water-curtain.

4. The air cleaner as claimed in claim 1, wherein an upper limit of water level in the central tank is about half the height of the central tank.

5. The air cleaner as claimed in claim 1 further comprising a water-mill activated carbon adsorbing apparatus including a plurality of symmetrical separation plates and an activated carbon bag diagnosed between each pair of adjacent separation plates and being adapted to be rotated in a water purifier by a drive motor so as to adsorb pollutants in the water.

* * * * *